United States Patent
van Adrichem et al.

(10) Patent No.: US 7,681,166 B2
(45) Date of Patent: Mar. 16, 2010

(54) METHOD AND APPARATUS FOR PERFORMING DUMMY-FILL BY USING A SET OF DUMMY-FILL CELLS

(75) Inventors: Paulus J. M. van Adrichem, Wichen (NL); Denis L. Goinard, Menlo Park, CA (US)

(73) Assignee: Synopsys, Inc., Mountain View, CA (US)

( * ) Notice: Subject to any disclaimer, the term of this patent is extended or adjusted under 35 U.S.C. 154(b) by 230 days.

(21) Appl. No.: 11/863,577

(22) Filed: Sep. 28, 2007

(65) Prior Publication Data
US 2009/0089732 A1 Apr. 2, 2009

(51) Int. Cl.
G06F 17/50 (2006.01)
G06F 9/45 (2006.01)

(52) U.S. Cl. .............................................. 716/9; 716/8

(58) Field of Classification Search .................. 716/8, 716/9
See application file for complete search history.

(56) References Cited

U.S. PATENT DOCUMENTS

| | | | |
|---|---|---|---|
| 5,985,699 A | | 11/1999 | Yokoyama |
| 7,448,010 B1 * | | 11/2008 | Lenahan et al. ............... 716/10 |
| 2002/0144224 A1 * | | 10/2002 | Frerichs et al. ................ 716/4 |
| 2004/0083438 A1 | | 4/2004 | Ohba |
| 2004/0098688 A1 * | | 5/2004 | Vuong et al. ................... 716/8 |
| 2005/0028121 A1 * | | 2/2005 | Shrowty et al. ............... 716/10 |
| 2007/0166887 A1 | | 7/2007 | Chen |
| 2007/0245284 A1 * | | 10/2007 | Sinha et al. .................... 716/10 |
| 2008/0121939 A1 * | | 5/2008 | Murray et al. ............... 257/202 |

FOREIGN PATENT DOCUMENTS

| EP | 0820100 A2 | 7/1997 |
|---|---|---|
| WO | 0019490 A2 | 4/2000 |

OTHER PUBLICATIONS

Pawlowski, David M. et al., "Fast and Accurate OPC for Standard-Cell Layouts", pp. 7-12, Department of Electrical and Computer Engineering, University of Illinois at Urbana- Champaign, Jan. 23, 2007.
Kahng, Andrew B., "Key Directions and a Roadmap for Electrical Design for Manufacturability", pp. 83-88, Depts. of CSE and ECE, University of California at San Diego, Sep. 11, 2007.

* cited by examiner

*Primary Examiner*—Stacy A Whitmore
*Assistant Examiner*—Magid Y Dimyan
(74) *Attorney, Agent, or Firm*—Park, Vaughan & Fleming LLP

(57) ABSTRACT

An embodiment performs dummy fill in a design layout to achieve a target density that is within a narrow range of target densities. During operation, the system can receive a design layout that includes a region whose density is not within a desired range of target densities. Next, the system can receive a set of dummy-fill cells which can be used to place a dummy-fill array to fill an arbitrarily sized rectangle. The set of dummy-fill cells may contain assist features and optical proximity corrections which cause the dummy shapes to print properly regardless of the size of the dummy-fill array. The system may then determine a polygon in the design layout to fill with dummy-fill cells. Next, the system may fracture the polygon into a set of rectangles. The system may use the set of dummy-fill cells to place a dummy-fill array that fills a rectangle.

21 Claims, 4 Drawing Sheets

METHOD AND APPARATUS FOR PERFORMING DUMMY-FILL BY USING A SET OF DUMMY-FILL CELLS

FIELD OF THE INVENTION

The present invention relates to semiconductor design and manufacturing. More specifically, the present invention relates to performing dummy-fill in a design layout to achieve a target density that is within a narrow range of target densities.

BACKGROUND

Related Art

Rapid advances in computing technology have made it possible to perform trillions of computational operations each second on data sets that are sometimes as large as trillions of bytes. These advances can be attributed to the dramatic improvements in semiconductor manufacturing technologies which have made it possible to integrate tens of millions of devices onto a single chip.

The behavior of some manufacturing processes can be affected by the feature density of the layout. Specifically, a manufacturing process can behave differently in low density regions as compared to high density regions. Non-uniformity in the feature density can be reduced by performing dummy fill, i.e., by adding dummy features to unoccupied regions in the layout.

If the dummy features are small (with respect to the exposure wavelength), they may need assist features and optical proximity corrections to print properly. However, performing assist feature placement and optical proximity correction (OPC) on the dummy-filled layout can be extremely time consuming due to the sheer number of dummy features. Furthermore, if the manufacturing process is highly sensitive to feature density variations, the dummy fill process may need to create a dummy-filled layout whose feature density is within a narrow range of density values.

SUMMARY

Embodiments of the present invention provide systems and techniques for performing dummy fill in a design layout. Some semiconductor manufacturing technologies require the dummy fill technique to place dummy features so that the resulting layout meets stringent target density requirements. An embodiment can perform dummy fill so that the dummy-filled layout has a feature density that is within a narrow range of target feature densities. It is desirable that a dummy fill technique should not substantially increase the amount of time required to perform optical proximity correction and assist feature placement. An embodiment can perform dummy fill without substantially increasing the time required to perform resolution enhancement techniques on the dummy-filled layout.

During operation, an embodiment can receive a design layout that includes a region whose density is not within a narrow range of target densities. Next, the system can receive a set of dummy-fill cells which can be used to place a dummy-fill array to fill an arbitrarily sized rectangle. For example, the set of dummy-fill cells can include a corner cell, an edge cell, and a center cell. The set of dummy-fill cells may contain assist features and optical proximity corrections which cause the dummy shapes to print properly regardless of the size of the dummy-fill array that is created using the set of dummy-fill cells. The system may then determine a set of rectangles for placing dummy-fill arrays, and then place the dummy-fill arrays in one or more of these rectangles. Note that smaller arrays may have a lower feature density than larger arrays because corner and edge cells may have lower densities than a center cell.

In one embodiment, the system may position a grid of blocks on the design layout. Next, the system may select those blocks in the grid that do not conflict with other shapes in the design layout. The system may then form polygons by merging the selected blocks. Next, the system may fracture the polygons to obtain a set of rectangles, which can then be filled using dummy-fill arrays.

Note that since the system can use a set of dummy-fill cells that already have optical proximity corrections and/or assist features, the system may not have to perform these time consuming resolution enhancement techniques after placing the dummy-fill arrays. Furthermore, since the system can fill one rectangle at a time, it can achieve a target density that is within a narrow range of target densities.

DETAILED DESCRIPTION

Integrated Circuit (IC) Design Flow

Figure 1:
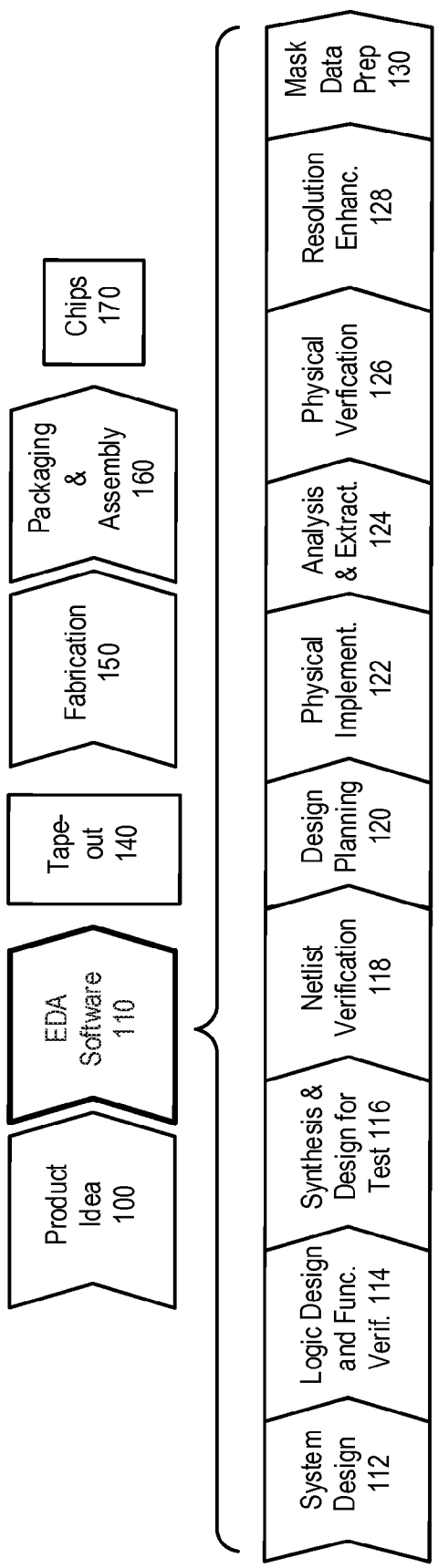
FIG. 1 illustrates various steps in the design and fabrication of an integrated circuit in accordance with an embodiment of the present invention.

FIG. 1 illustrates various steps in the design and fabrication of an integrated circuit in accordance with an embodiment of the present invention.

The process usually starts with a product idea (step 100) which is realized using an EDA software design process (step 110). Once the design is finalized, it is usually taped-out (event 140) and goes through the fabrication process (step 150) and packaging and assembly processes (step 160) to produce the finished chips (result 170).

The EDA software design process (step 110) comprises steps 112-130, which are described below for illustration purposes only and are not meant to limit the present invention. For example, an actual integrated circuit design may require the designer to perform the design steps in a different sequence than the sequence described below.

System design (step 112): In this step, the designers describe the functionality that they want to implement. They can also perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 114): At this stage, the VHDL or Verilog code for modules in the system is written and the design is checked for functional accuracy. More specifically, the design is checked to ensure that it produces the correct outputs. Exemplary EDA software products from Synopsys, Inc. that can be used at this step include VCS®, Vera®, DesignWare®, Magellan™, Formality®, ESP and Leda® products.

Synthesis and design for test (step 116): Here, the VHDL/Verilog is translated to a netlist. The netlist can be optimized for the target technology. Additionally, tests can be designed and implemented to check the finished chips. Exemplary EDA software products from Synopsys, Inc. that can be used at this step include Design Compiler®, Physical Compile®, Test Compiler, Power Compiler™, FPGA Compiler, TetraMAX®, and DesignWare® products.

Netlist verification (step 118): In this step, the netlist is checked for compliance with timing constraints and for correspondence with the VHDL/Verilog source code. Exemplary EDA software products from Synopsys, Inc. that can be used at this step include Formality®, PrimeTime®, and VCS® products.

Design planning (step 120): Here, an overall floorplan for the chip is constructed and analyzed for timing and top-level routing. Exemplary EDA software products from Synopsys, Inc. that can be used at this step include Astro™ and IC Compiler products.

Physical implementation (step 122): The placement (positioning of circuit elements) and routing (connection of the same) occurs at this step. Exemplary EDA software products from Synopsys, Inc. that can be used at this step include the Astro™ and IC Compiler products.

Analysis and extraction (step 124): At this stage, the circuit function is verified at a transistor level, this in turn permits what-if refinement. Exemplary EDA software products from Synopsys, Inc. that can be used at this step include AstroRail™, PrimeRail, PrimeTime®, and Star-RCXT™ products.

Physical verification (step 126): In this step, the design is checked to ensure correctness for manufacturing, electrical issues, lithographic issues, and circuitry. Exemplary EDA software products from Synopsys, Inc. that can be used at this step include the Hercules™ product.

Resolution enhancement (step 128): This step involves geometric manipulations of the layout to improve manufacturability of the design. Exemplary EDA software products from Synopsys, Inc. that can be used at this step include Proteus/Progen, ProteusAF, and PSMGen products.

Mask data preparation (step 130): This step provides the "tape-out" data for production of masks to produce finished chips. Exemplary EDA software products from Synopsys, Inc. that can be used at this step include the CATS® family of products.

Embodiments of the present invention can be used during one or more of the above-described steps. Specifically, one embodiment of the present invention can be used during the physical verification step 126.

Dummy Fill

Dummy fill is typically used to ensure that variations in post-CMP (chemical mechanical polishing) surface topography are within a given tolerance. For example, a foundry may place non-functional structures into unoccupied areas in the design layout so that the layout produces a substantially flat surface after CMP. Dummy fill can also be used to reduce process variations of other manufacturing processes that are affected by variations in feature densities.

Figure 2:
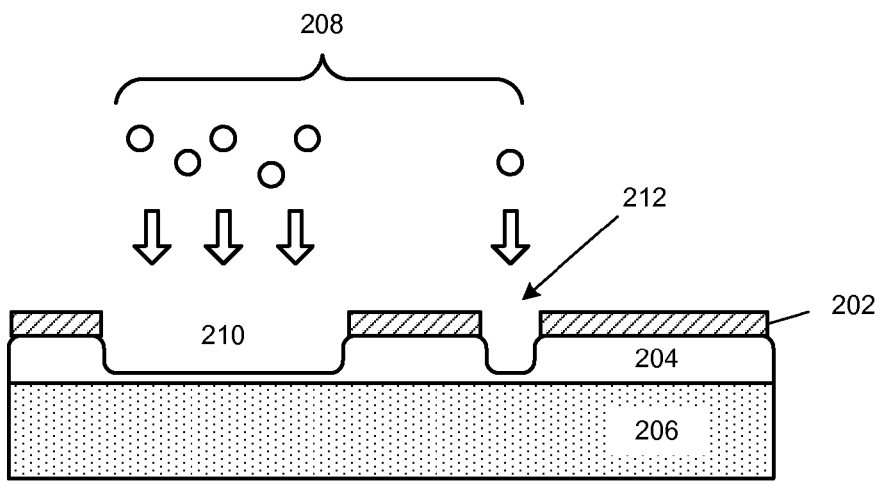
FIG. 2 illustrates process loading effects in accordance with an embodiment of the present invention.

FIG. 2 illustrates process loading effects in accordance with an embodiment of the present invention.

During fabrication, resist layer 202 may be positioned on silicon dioxide layer 204 which may be positioned on wafer 206. Reactive ions 208 may be used during a deep etch process to create trenches. The etch rate at a location can depend on the feature density in proximity to that location. For example, the etch rate in low feature density regions, e.g., region 210, can be higher than the etch rate in regions with high feature densities, e.g., region 212. Dummy fill may be used to ensure that the etch rate variations are within an acceptable range.

Chip fabrication can typically tolerate a range of process variations. If the process variations are greater than the acceptable range, the resulting chips may completely fail to work or they may have poor performance metrics. At current integration densities, the process latitude can be very small, i.e., the acceptable range of process variations may be very small.

For a deep etch process, we may need to ensure that the trench depths are within a narrow range of values. Note that the trench depth can be highly sensitive to the reactive ion concentration in proximity to the trench. The reactive ion concentration, in turn, can be highly sensitive to the feature density. Consequently, to ensure a high yield, the feature density may be required to be within a narrow range of values. Unfortunately, conventional dummy fill techniques are usually not designed to meet such stringent feature density constraints.

Furthermore, once dummy fill structures are placed in the layout, they may need optical proximity correction and assist features to print properly. However, the number of dummy fill features that are placed in the layout can be quite large. Hence, it may be impractical to perform optical proximity correction and/or assist feature placement due to the sheer number of dummy fill features.

One embodiment of the present invention provides systems and techniques for placing dummy fill features so that the feature density is within a narrow range of density values. For example, the narrow range of density values can be 0.1%, where a 0% density value corresponds to a completely unoccupied region and a 100% density value corresponds to a completely occupied region. Furthermore, an embodiment places dummy fill structures that already have optical proximity corrections and assist features, thereby obviating the need for performing optical proximity correction and/or assist feature placement on the dummy features.

Process for Performing Dummy Fill

Figure 3:
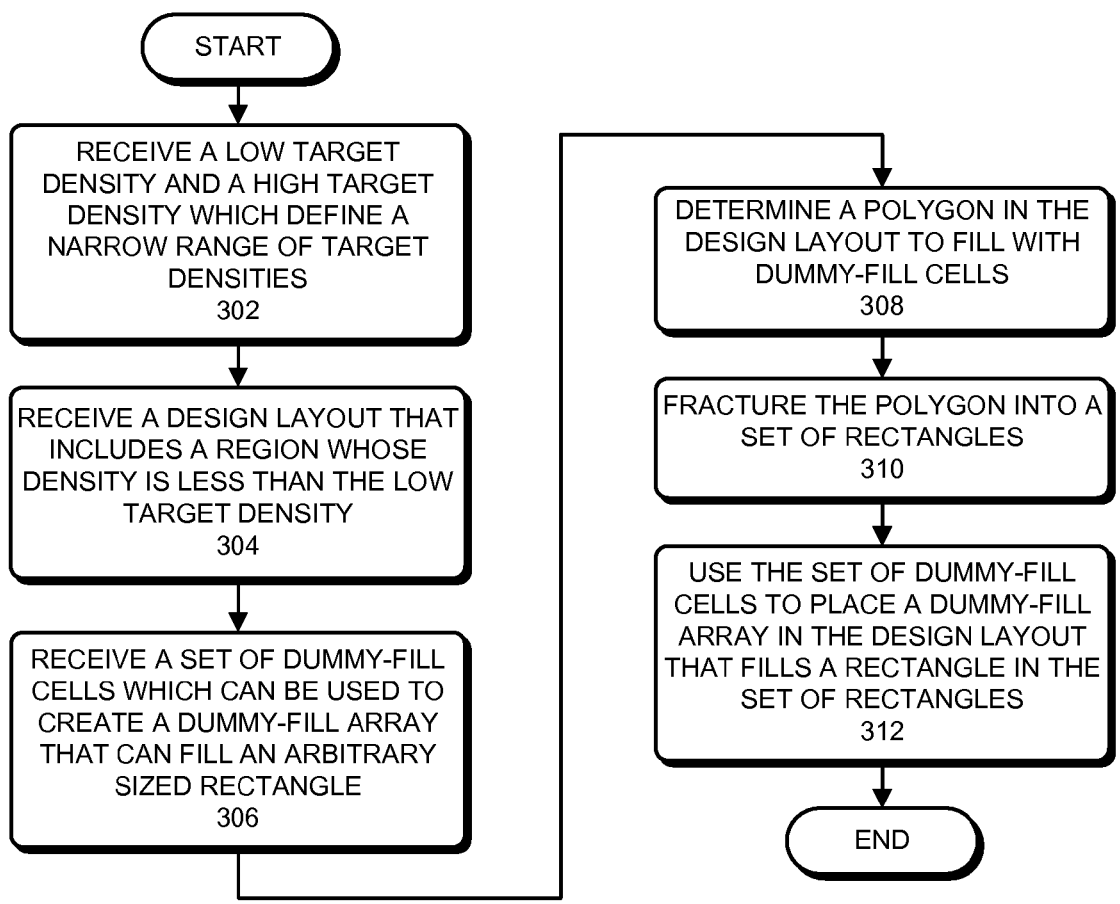
FIG. 3 presents a flowchart that illustrates a process for performing dummy fill in a design layout in accordance with an embodiment of the present invention.

FIG. 3 presents a flowchart that illustrates a process for performing dummy fill in a design layout in accordance with an embodiment of the present invention.

The process may begin by receiving a low target density and a high target density which define a narrow range of target densities (step 302).

Next, the system may receive a design layout that includes a region whose density is less than the low target density (step 304).

Placing dummy-fill shapes in the design layout can increase the density so that it is within the narrow range of target densities. At current integration densities the dummy shapes can be so small that they may require assist features and optical proximity correction to print properly. However, performing assist feature placement and optical proximity correction after placing the dummy shapes in the design layout can be impractical or even computationally infeasible because of the sheer number of dummy features that may be required in a design layout. For example, a DRAM (dynamic random access memory) layout may require a large number of dummy fill structures, and hence, applying resolution enhancement techniques on the dummy-filled DRAM layout may be impractical.

One embodiment of the present invention uses a set of dummy-fill cells which already have optical proximity corrections and assist features so that the embodiment doesn't have to apply resolution enhancement techniques after placing the dummy-fill structures.

Continuing with the flowchart in FIG. 3, the system may then receive a set of dummy-fill cells (step 306). The system may also receive the relative positions of the dummy-fill cells. These dummy-fill cells can be used to create a dummy-fill array that can fill an arbitrarily sized rectangle. The set of dummy-fill cells may contain assist features and optical proximity corrections which can cause the dummy shapes to print properly regardless of the size of the dummy-fill array. Note that the dummy-fill cells may or may not abut one another in the dummy-filled array.

In general, the set of dummy-fill cells may include one or more cells that can be used to create a dummy-fill array. In one embodiment, the set of dummy-fill cells may include three cells: a corner cell, an edge cell, and a center cell. In another embodiment, the set of dummy-fill cells may include nine cells: a top-left cell, a top-right cell, a bottom-left cell, a bottom-right cell, a top-center cell, a right-center cell, a bottom-center cell, a left-center cell, and a center cell. Note that, in some situations, it may be possible to use simple geometric operations (e.g., rotation and/or reflection) to create a set of nine cells from a set of three cells. In yet another embodiment, the system may receive only one cell which can be replicated to form an arbitrary sized array.

Figure 4:
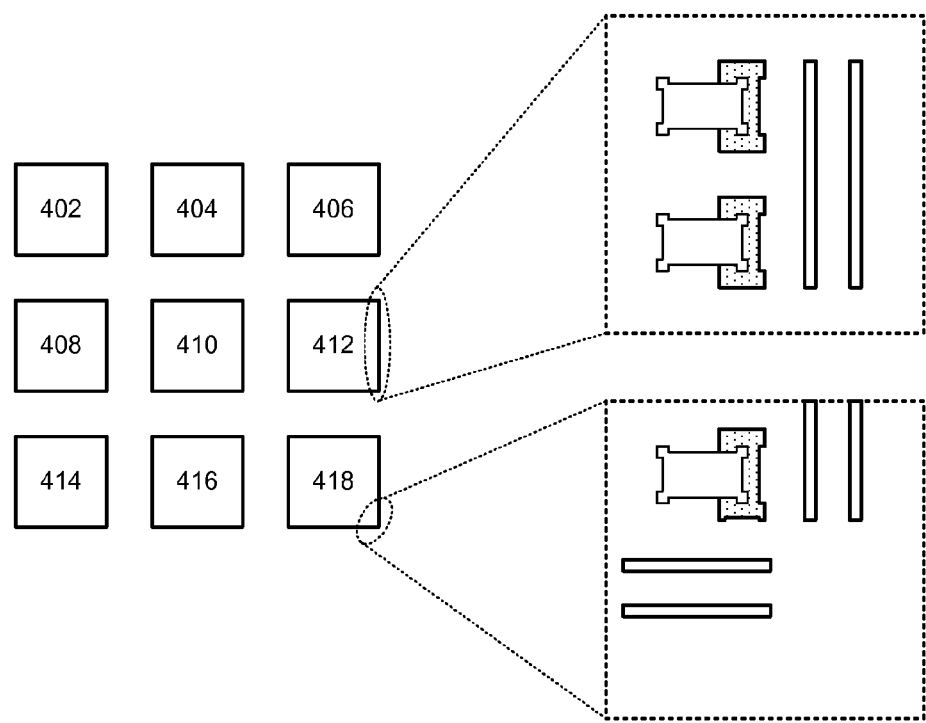
FIG. 4 illustrates a set of dummy fill cells in accordance with an embodiment of the present invention.

FIG. 4 illustrates a set of dummy fill cells in accordance with an embodiment of the present invention.

A set of dummy fill cells may comprise top-left cell 402, top-right cell 406, bottom-left cell 414, bottom-right cell 418, top-center cell 404, right-center cell 412, bottom-center cell 416, left-center cell 408, and center cell 410. The cells can comprise different shapes and optical proximity corrections and/or assist features. For example, the structures, optical proximity corrections, and assist features in an edge-cell, e.g., right-center cell 412 (see the blowup), can be different from those in a corner-cell, e.g., bottom-right cell 418 (see the blowup). The set of dummy fill cells may have the following important property: they can be used to create arbitrary sized arrays that don't require any additional optical proximity corrections or assist feature placements to print properly.

Next, the system may determine a polygon in the design layout to fill with dummy-fill cells (step 308).

In one embodiment the system positions a grid of blocks in the design layout. A block can be a square or a rectangle that can hold an array of nine cells. Each block in the grid may abut neighboring blocks. Next, the system can remove blocks that conflict with shapes in the design layout. The system can merge the remaining blocks to obtain polygons.

The system can then fracture the polygon into a set of rectangles (step 310). In one embodiment, the dimensions of each rectangle may be integral multiples of the grid block dimensions.

In one embodiment, the system can fracture the polygon into a set of rectangles in such a way that no rectangle has an area greater than an upper limit. This may be desirable to ensure that the system does not overshoot the high density value while performing dummy fill. If the system overshoots the high density value, the system can remove the dummy-fill array that caused the layout to overshoot the high density value.

Figure 5:
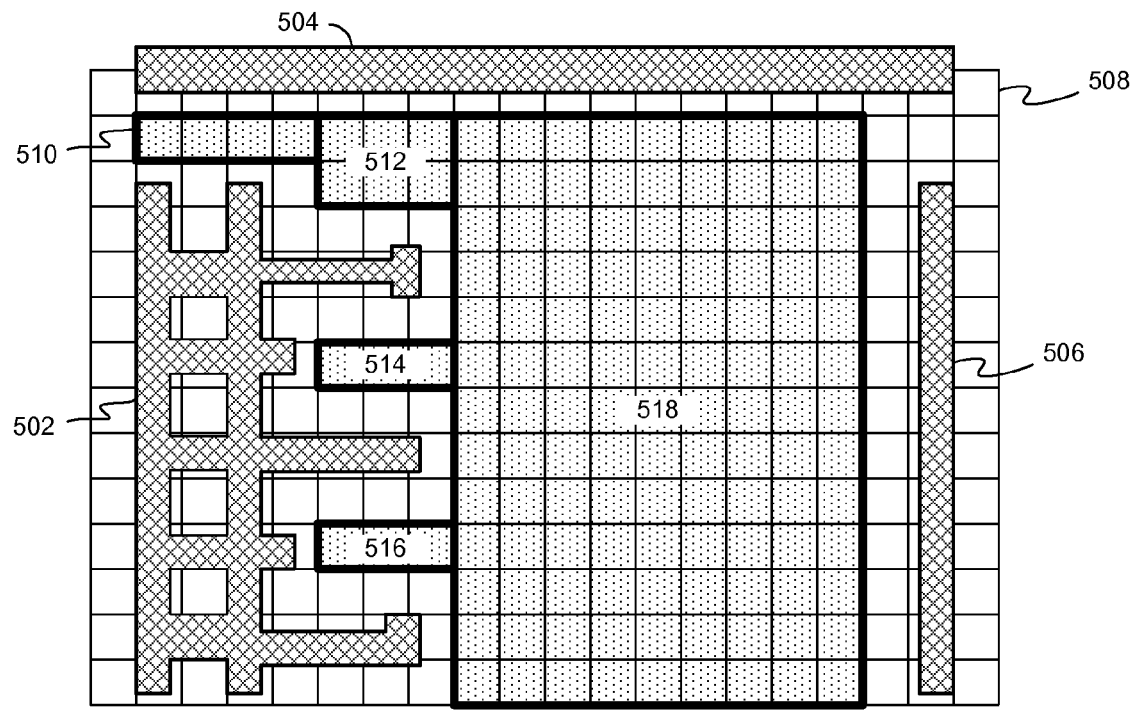
FIG. 5 illustrates how a system can determine a polygon and then fracture it into a set of rectangles in accordance with an embodiment of the present invention.

FIG. 5 illustrates how a system can determine a polygon and then fracture it into a set of rectangles in accordance with an embodiment of the present invention.

Regions 502, 504, and 506 of the design layout can include functions structures. The system may position grid 508 in the design layout. Each block in grid 508 may be large enough to contain a set of nine or more cells. Next, the system may select the blocks that do not conflict with the structures in the design layout. A block may conflict with a structure if placing cells in the block would violate a design rule. For example, the system may select the shaded blocks in grid 508. The system may then merge the selected blocks to form a polygon. For example, the system may merge the shaded blocks in grid 508 to form a polygon. Alternatively, the system may remove blocks that conflict with structures in the design layout, and merge the remaining blocks to obtain a polygon. Next, the system may fracture the polygon to obtain a set of rectangles, e.g., rectangles 510, 512, 514, 516, and 518.

Next, the system may use the set of dummy-fill cells to place a dummy-fill array in the design layout that fills a rectangle in the set of rectangles (step 312). In one embodiment the system may place the dummy-fill array in a top cell. Note that the dummy-fill array may not fill the rectangle completely, i.e., the area filled by the dummy-fill array can be less than the area of the rectangle.

In one embodiment, the system may select the rectangle with the largest area. Specifically, the system may sort the rectangles in decreasing order of their areas, and fill the rectangles starting from the largest rectangle until the feature density of the layout is between the low target density and the high target density.

Figure 6:
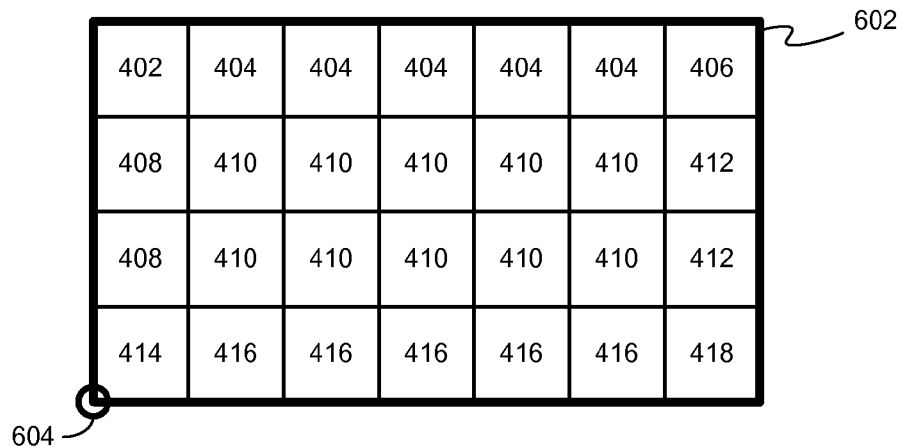
FIG. 6 illustrates how a set of dummy fill cells can be used to create a dummy-fill array in accordance with an embodiment of the present invention.

FIG. 6 illustrates how a set of dummy fill cells can be used to create a dummy-fill array in accordance with an embodiment of the present invention.

Rectangle 602 can be filled using the set of cells shown in FIG. 4. Specifically, rectangle 602 can be filled by placing corner cells 402, 406, 414, and 418 in the corners, placing edge cells 404, 408, 412, and 416 along the edges, and filling the rest of the rectangle with center cell 410. It will be apparent that the above technique can be used to fill an arbitrarily sized rectangle. The assist features and optical proximity corrections in each cell are designed so that they are effective regardless of the size of the rectangle.

Note that smaller arrays may have a lower density and larger arrays may have a higher density. Corner cells and edge cells may include sub-resolution assist features (SRAFs). Hence, the density of corner cells and edge cells may be less than the density of the center cell because the center cell may not have any assist features, or it may have fewer assist features than the corner cells and edge cells. For example, the density of the 3×3 array shown in FIG. 4 may be less than the density of the 4×7 array shown in FIG. 6. In one embodiment, the system may fill larger rectangles before filling smaller rectangles so that the system increases the feature density as quickly as possible.

In one embodiment, the system may place a dummy-fill array in two steps: first, the system may create a dummy-fill array using the set of dummy-fill cells, and then the system may place the dummy-fill array in the design layout.

Specifically, the system may first determine the relative positions of the cells in the rectangle. For example, in FIG. 6, the system may determine the relative position of all the cells in the array with respect to the position of the bottom-left cell

414. Next, the system may place bottom-left cell 414 in the rectangle 602's bottom-left corner 604. The other cells in the array can then be placed using their relative positions with respect to the bottom-left cell 414's position. In one embodiment, the minimum array size may be 3×3.

Note that the process can perform dummy fill operation using a global approach or a window based approach. In a global approach, the system may perform dummy fill for the entire design layout. On the other hand, in a window based approach, the system can perform dummy fill for each window.

In one embodiment, the system can perform dummy fill in an iterative fashion. For example, the system may sort rectangles in decreasing order of their areas. Next, the system may iteratively perform dummy fill by filling rectangles with the largest area and progressively filling rectangles with smaller areas. The system may compute the feature density multiple times during the iterative process (e.g., the system may compute the feature density after it fills each rectangle), and it may terminate the process once the feature density of the layout (or the window) is within an acceptable range of densities.

Figure 7:
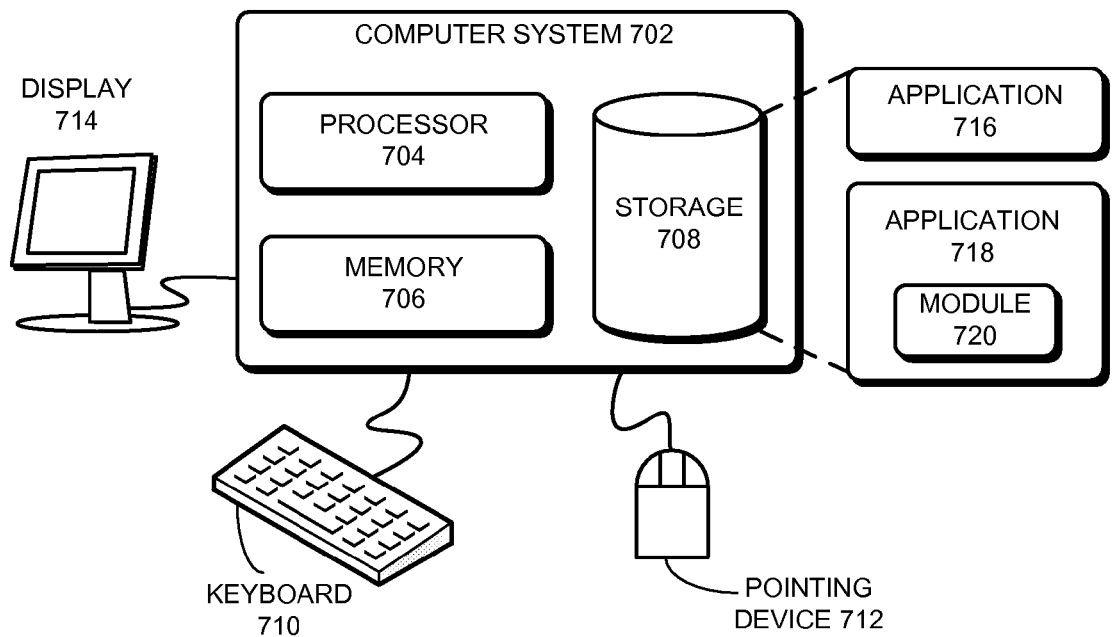
FIG. 7 illustrates a computer system in accordance with an embodiment of the present invention.

FIG. 7 illustrates a computer system in accordance with an embodiment of the present invention.

Computer system 702 comprises processor 704, memory 706, and storage device 708. Computer system 702 can be coupled to display 714, keyboard 710, and pointing device 712. Storage device 708 can store application 716 and application 718 which may include module 720. Applications 716 and 718 can include instructions that when executed by a computer cause the computer to perform a process for performing dummy fill.

During operation, computer system 702 can load application 716 into memory 706. Next, the system can use application 716 to perform dummy fill. Alternatively, the dummy-fill operation may be performed by module 720 which may be part of application 718 that is used for performing other steps in the IC design flow.

CONCLUSION

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Furthermore, the foregoing descriptions of embodiments of the present invention have been presented only for purposes of illustration and description. They are not intended to be exhaustive or to limit the present invention to the forms disclosed. Accordingly, many modifications and variations will be readily apparent to practitioners skilled in the art. Additionally, the above disclosure is not intended to limit the present invention. The scope of the present invention is defined by the appended claims.

What is claimed is:

1. A computer-executed method for performing dummy fill in a design layout to achieve a target density that is within a narrow range of target densities, the method comprising:
   receiving a low target density and a high target density which define a narrow range of target densities;
   receiving a design layout that includes a region whose density is less than the low target density, but whose density is increasable by placing dummy shapes which require assist features and optical proximity corrections to print properly;
   receiving a set of dummy-fill cells which is used to place a dummy-fill array to fill an arbitrarily sized rectangle, and which includes assist features and optical proximity corrections to obviate the need for performing assist feature placement and optical proximity correction on the dummy fill array;
   determining, by one or more computers, a polygon in the design layout to fill with dummy-fill cells;
   fracturing the polygon into a set of rectangles; and
   using the set of dummy-fill cells to place a first dummy-fill array in the design layout that fills a first rectangle in the set of rectangles.

2. The method of claim 1, wherein the set of dummy-fill cells includes:
   a top-left cell;
   a top-right cell;
   a bottom-left cell;
   a bottom-right cell;
   a top-center cell;
   a right-center cell;
   a bottom-center cell;
   a left-center cell; and
   a center cell.

3. The method of claim 1, further comprising selecting the first rectangle, wherein the first rectangle has a largest area in the set of rectangles.

4. The method of claim 1, wherein using the set of dummy-fill cells to place the first dummy-fill array includes:
   determining a number of columns in the first dummy-fill array; and
   determining a number of rows in the first dummy-fill array.

5. The method of claim 1, wherein determining the polygon includes:
   positioning a grid of blocks in the design layout;
   removing blocks that conflict with shapes in the design layout; and
   merging blocks to obtain polygons.

6. The method of claim 1, wherein the set of dummy-fill cells includes:
   a corner cell;
   an edge cell; and
   a center cell.

7. The method of claim 1, wherein using the set of dummy-fill cells to place the first dummy-fill array includes:
   determining corner cell locations;
   determining edge cell locations; and
   determining center cell locations.

8. A computer-readable storage medium storing instructions that when executed by a computer cause the computer to perform a method for performing dummy fill in a design layout to achieve a target density that is within a narrow range of target densities, the method comprising:
   receiving a low target density and a high target density which define a narrow range of target densities;
   receiving a design layout that includes a region whose density is less than the low target density, but whose density is increasable by placing dummy shapes which require assist features and optical proximity corrections to print properly;
   receiving a set of dummy-fill cells which is used to place a dummy-fill array to fill an arbitrarily sized rectangle, and which includes assist features and optical proximity corrections to obviate the need for performing assist feature placement and optical proximity correction on the dummy fill array;

determining a polygon in the design layout to fill with dummy-fill cells;

fracturing the polygon into a set of rectangles; and using the set of dummy-fill cells to place a first dummy-fill array in the design layout that fills a first rectangle in the set of rectangles.

9. The computer-readable storage medium of claim 8, wherein the set of dummy-fill cells includes:
a top-left cell;
a top-right cell;
a bottom-left cell;
a bottom-right cell;
a top-center cell;
a right-center cell;
a bottom-center cell;
a left-center cell; and
a center cell.

10. The computer-readable storage medium of claim 8, the method further comprising selecting the first rectangle, wherein the first rectangle has a largest area in the set of rectangles.

11. The computer-readable storage medium of claim 8, wherein using the set of dummy-fill cells to place the first dummy-fill array includes:
determining a number of columns in the first dummy-fill array; and
determining a number of rows in the first dummy-fill array.

12. The computer-readable storage medium of claim 8, wherein determining the polygon includes:
positioning a grid of blocks in the design layout;
removing blocks that conflict with shapes in the design layout; and
merging blocks to obtain polygons.

13. The computer-readable storage medium of claim 8, wherein the set of dummy-fill cells includes:
a corner cell;
an edge cell; and
a center cell.

14. The computer-readable storage medium of claim 8, wherein using the set of dummy-fill cells to place the first dummy-fill array includes:
determining corner cell locations;
determining edge cell locations; and
determining center cell locations.

15. An apparatus for performing dummy fill in a design layout to achieve a target density that is within a narrow range of target densities, the apparatus comprising:
a density receiving mechanism configured to receive a low target density and a high target density which define a narrow range of target densities;
a layout receiving mechanism configured to receive a design layout that includes a region whose density is less than the low target density, but whose density is increasable by placing dummy shapes which require assist features and optical proximity corrections to print properly;
a cell receiving mechanism configured to receive a set of dummy-fill cells which is used to place a dummy-fill array to fill an arbitrarily sized rectangle, and which includes assist features and optical proximity corrections to obviate the need for performing assist feature placement and optical proximity correction on the dummy fill array;
a determining mechanism configured to determine a polygon in the design layout to fill with dummy-fill cells;
a fracturing mechanism configured to fracture the polygon into a set of rectangles; and
an array-placing mechanism configured to use the set of dummy-fill cells to place a first dummy-fill array in the design layout that fills a first rectangle in the set of rectangles.

16. The apparatus of claim 15, wherein the set of dummy-fill cells includes:
a top-left cell;
a top-right cell;
a bottom-left cell;
a bottom-right cell;
a top-center cell;
a right-center cell;
a bottom-center cell;
a left-center cell; and
a center cell.

17. The apparatus of claim 15, further comprising a selecting mechanism configured to select the first rectangle, wherein the first rectangle has a largest area in the set of rectangles.

18. The apparatus of claim 15, wherein the array-placing mechanism is configured to:
determine a number of columns in the first dummy-fill array; and
determine a number of rows in the first dummy-fill array.

19. The apparatus of claim 15, wherein the determining mechanism is configured to:
position a grid of blocks in the design layout;
remove blocks that conflict with shapes in the design layout; and
merge blocks to obtain polygons.

20. The apparatus of claim 15, wherein the set of dummy-fill cells includes:
a corner cell;
an edge cell; and
a center cell.

21. The apparatus of claim 15, wherein the array-placing mechanism is configured to:
determine corner cell locations;
determine edge cell locations; and
determine center cell locations.

* * * * *